United States Patent [19]

Silha

[11] Patent Number: 5,715,438
[45] Date of Patent: Feb. 3, 1998

[54] SYSTEM AND METHOD FOR PROVIDING TIME BASE ADJUSTMENT

[75] Inventor: Edward J. Silha, Austin, Tex.

[73] Assignee: International Business Machines Corporation, Armonk, N.Y.

[21] Appl. No.: 503,957

[22] Filed: Jul. 19, 1995

[51] Int. Cl.[6] .................................................. G06F 1/14
[52] U.S. Cl. ..................................... 395/551; 395/558
[58] Field of Search ............................ 395/551, 555, 395/557, 558

[56] References Cited

U.S. PATENT DOCUMENTS

| | | |
|---|---|---|
| 4,053,926 | 10/1977 | Lemoine et al. . |
| 4,575,848 | 3/1986 | Moore et al. ............................ 371/61 |
| 4,882,739 | 11/1989 | Potash et al. . |
| 4,893,318 | 1/1990 | Potash et al. . |
| 4,903,251 | 2/1990 | Chapman ............................ 368/156 |
| 5,087,829 | 2/1992 | Ishibashi et al. . |
| 5,293,627 | 3/1994 | Kato et al. ............................ 395/550 |
| 5,297,275 | 3/1994 | Thayer ............................ 395/550 |

*Primary Examiner*—Dennis M. Butler
*Attorney, Agent, or Firm*—Anthony V. S. England; Andrew J. Dillon

[57] ABSTRACT

An apparatus and method are disclosed that provide system time base generation in a data processing system. The data processing system may have a single microprocessor or have multiple microprocessors. In either case, the data processing system has a plurality of devices that are time dependent upon the lead microprocessor within the data processing system. The apparatus includes a system clock generation circuit coupled to the microprocessor via a bus interface and a clock prescalar, further coupled to the system clock generation circuit and the bus interface, that is used to provide a clock pulse adjustment based upon a threshold count level as determined by the system clock generation circuit and the microprocessor.

15 Claims, 3 Drawing Sheets

SYSTEM AND METHOD FOR PROVIDING TIME BASE ADJUSTMENT

BACKGROUND OF THE INVENTION

1. Technical Field

The present invention relates generally to a time base control for a computer system and, more specifically, to a time base control method and system for synchronizing a system clock in a computer system with a processor or other timing chips within the computer system. More particularly still, the present invention relates to a method and system for providing time base control in a computer system that adjusts the time base time to match the real time clock for increased time accuracy.

2. Description of the Related Art

Timing mechanisms in computer systems are well-known in the art. These timing systems unfortunately tend to drift over a period of time and are not as accurate as a time piece specifically designed for keeping time, such as, for example, a wrist watch or a desk clock. Several solutions have been proposed to increase the accuracy of the real time measuring capability of a computer system. One such solution is based on the future bus plus IEEE standard 896 that includes a system clock synchronization protocol. Unfortunately, the standard is fairly complex and requires a significant amount of hardware, thus driving up the cost of the system. Additionally, its accuracy is less than desired.

Another solution is that in network connected single processor systems. When such a system is connected to a network, especially systems involved in transaction processing and distributed database management, the network provides network clock synchronization protocols to keep its clock synchronized with the rest of the network. The protocol is typically ran frequently. Each correction computed as a result of this protocol may require multiple corrections to the system clock, especially if the clock is running fast. If the clock is running fast, the corrections must be small enough such that no application running on the system can observe the clock running backward or observing an earlier time than the last observation.

Another solution is found in multi-processor systems. In multi-processor systems, synchronizing the clocks requires interrupting all the processors and waiting until they all reach a point where they can accept the interrupt. The processors would then run a clock synchronization protocol. Without some hardware assist, the best result that could be expected would be that the clocks are synchronized within twenty to a few hundred processor cycles of each other. With a hardware assist, such as a clock enable that started all clocks on the same cycle, they would all have an identical time.

The multi-processor system may also be operated on a network system. Although only one processor runs the network clock synchronization protocol, all the processors must apply the correction, requiring the same clock synchronization as if in a single system multi-processor system. Again, in the case where the clocks are faster than the maximum allowable correction, the correction process would require multiple executions of the time adjustment process to insure that the adjustments do not cause executing programs to observe time running backwards.

Alternative solutions include providing a system clock enable hardware assist for clock synchronization, but this requires the use of a extra pin or, in the alternative, complex bus protocol. Additionally, a programming solution is also possible that provides a similar model for clock control on all systems regardless of the processing chip used.

Unfortunately, none of the these solutions provides the desired accuracy as well as ease of implementation. Accordingly, what is need is a time base control system and method that does not require multiple updates to adjust for large errors while minimizing the effect of time drift other than that inherent in the timing crystal typically used in a computer system.

SUMMARY OF THE INVENTION

It is therefore one object of the present invention to provide a time base control for a computer system.

It is another object of the present invention to provide a time base control method and system for synchronizing the real time clock in each process or of a computer system.

It is yet another object of the present invention to provide a method and system for providing time base control in a computer system that adjusts the time base frequency to control the rate at which the processor real time clock advances.

The foregoing objects are achieved as is now described. According to the present invention, an apparatus and method are disclosed that provide system time base generation in a data processing system. The data processing system may have a single microprocessor or multiple microprocessors. In either case, the data processing system has a plurality of devices that are time dependent upon the lead microprocessor within the data processing system. The apparatus includes a system clock generation circuit coupled to the microprocessor via a bus interface and a clock prescalar, further coupled to the system clock generation circuit and the bus interface, that is used to provide a clock pulse adjustment based upon a threshold count level as determined by the system clock generation circuit and the microprocessor.

The apparatus further includes a total count latch register, coupled to the clock prescalar, that performs a time base count for determining the threshold count based on the information from the microprocessor. The information is a specific value computed by the system and stored in the threshold count latch. A data line is further provided that synchronously couples the system clock generation circuit to the microprocessor to reduce the clock drift and to provide a more precise time using standard precision crystals. Further, the time base enable pin of the processor is also a normal data input, which provides further simplification than is typically possible in the complex synchronization in prior clock synchronizing solutions.

The method consists of selecting a lead processor, which, in a single processor based system, is the main processor that drives the other devices in timing sequence. Once the lead processor is selected, the lead processor waits until the other timing dependent devices within the data processing system have reached a first barrier. At this time, the lead processor selects a correct time within the data processing system and stores that correct time in a memory location. Once the correct time has been identified, then the first barrier is released. Once the first barrier has been released, the system then determines whether all other time dependent devices have reached a second barrier. At this time, the lead processor starts a time base and reads the correct time from memory to set the processors clock with the correct time and thereby setting the clocks of all the remaining devices. A clock pulse adjustment is provided from time to time upon a threshold count level from the lead processor in order to maintain consistent and accurate timing.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
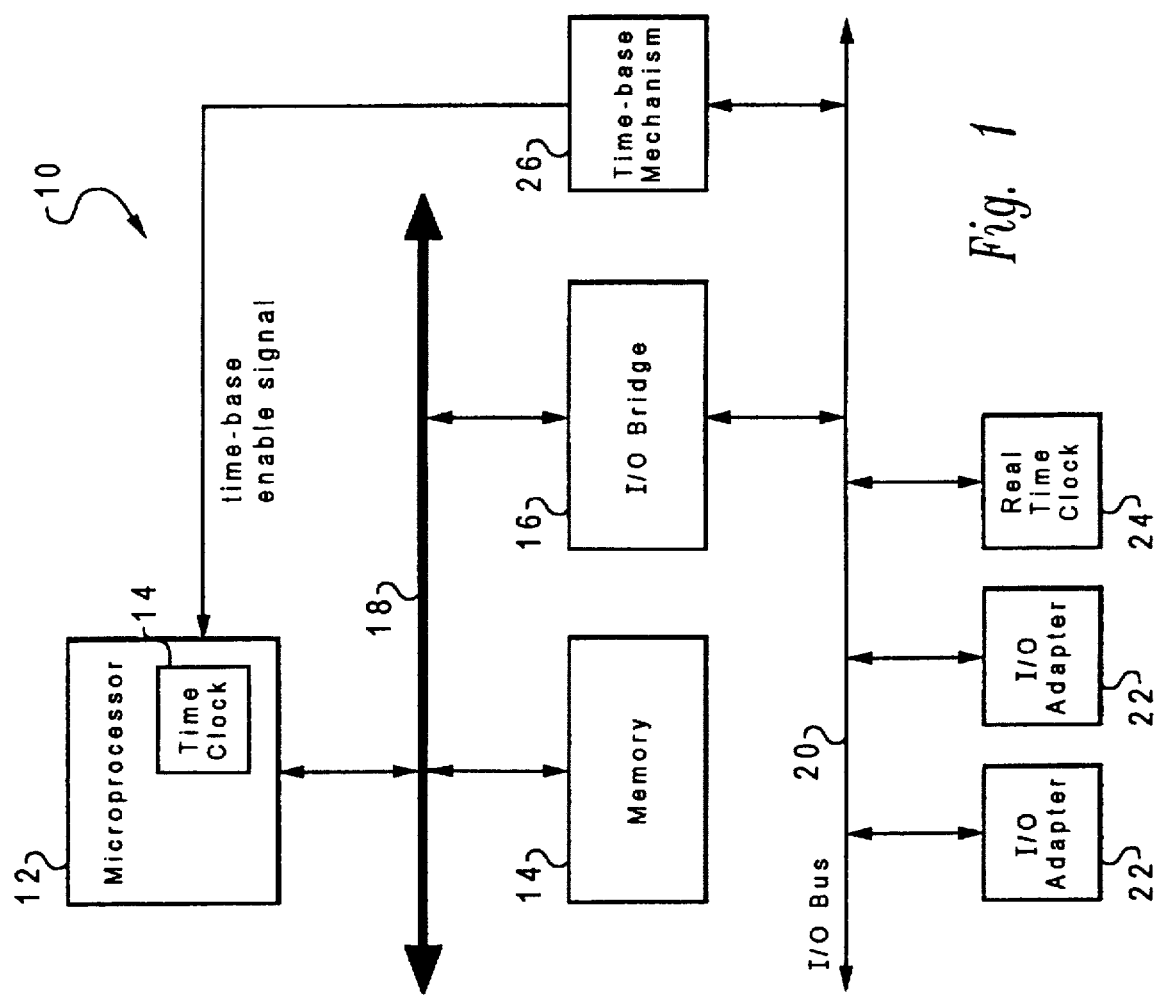
FIG. 1 depicts a data processing system that uses a separate timebased generation device unit to measure real time according to the present invention.

Referring now to the figures, and in particular to FIG. 1, a data processing system 10, in which the present invention can be employed is depicted. As shown, data processing system 10 comprises a number of components, which are interconnected together. More particularly, a microprocessor 12 is coupled to a memory storage unit 14 and an input/output (I/O) bridge 16. A system bus 18 provides interconnection between microprocessor 12 and memory 14 and I/O bridge 16. I/O bridge 16 further couples to an I/O bus 20, which provides connection to I/O adapters 22 and a real time clock 24. Further connected to microprocessor 12 is a time base generation apparatus 26, which is further connected to the I/O bus 20. Time based generation apparatus 26 is further illustrated in FIG. 2. Data processing system 10 may comprise multiple microprocessors.

Figure 2:
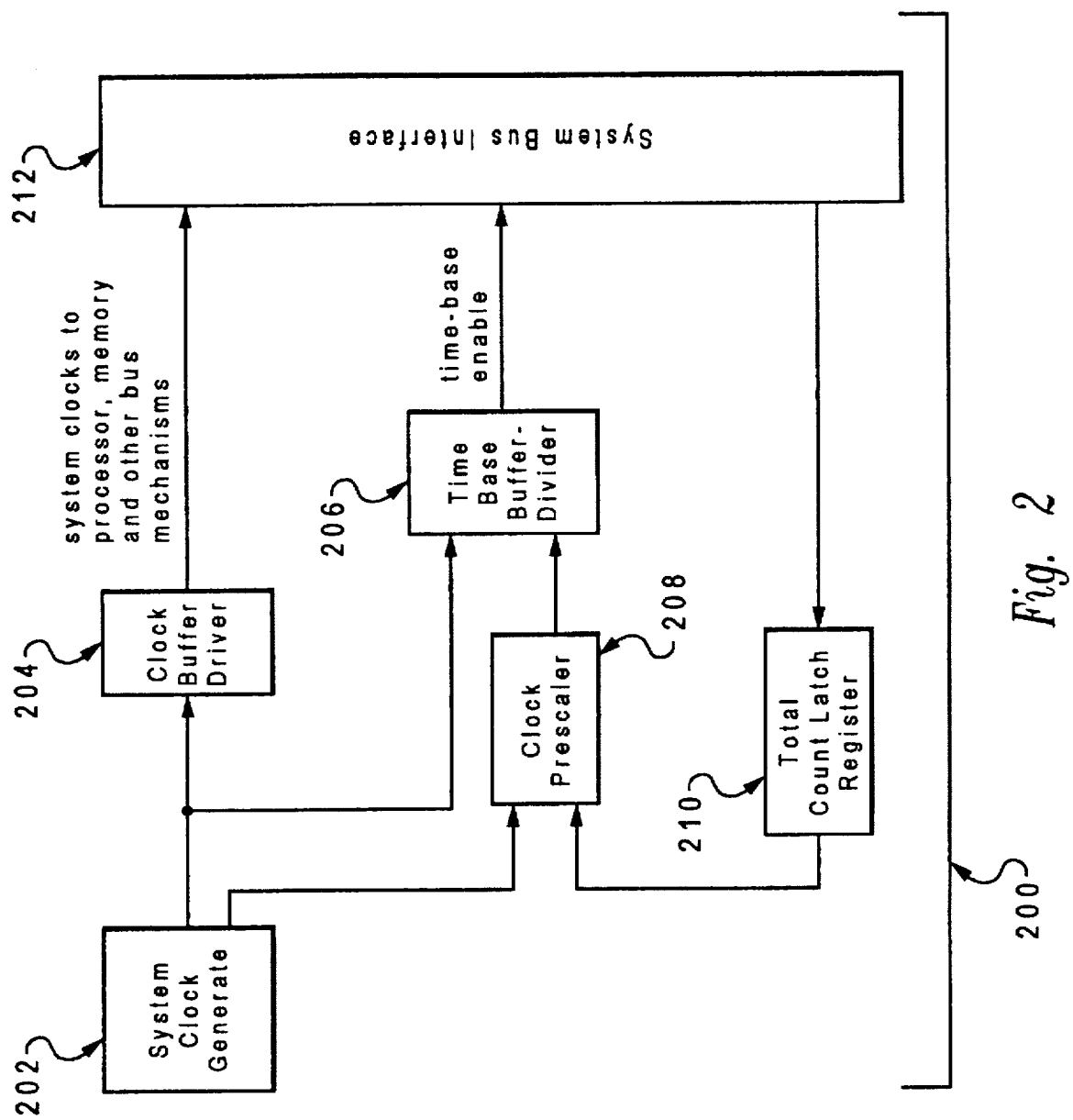
FIG. 2 is a block diagram of the time-based generation device in FIG. 1.

FIG. 2 illustrates a block diagram of an implementation of the system time base generation apparatus 200 according to the present invention. Time base generation apparatus 200 further includes a system clock generate circuit 202, which serves as a master clock for the entire computer system in which apparatus 200 is located. System clock generate circuit 202 is further connected to a clock buffer driver 204, a time base buffer/divider 206, clock prescalar circuit 208, and a total count latch register 210. Clock buffer divider 204 is further connected to bus interface 212, as is time base buffer/divider circuit 206 and total count latch register 210. Clock buffer/divider 204 provides signal amplification and driving from system clock generate circuit 202 to the bus interface 212, which is further connected to the system co-processor, micro-processor, and other resource chips connected to the bus interface. A store instruction to the address decoded by the system bus interface as the total count latch register 210 is used to set the content of total count latch register 210. The content of total count latch register 210 is used by the clock prescalar 208 to control whether the time base enable signal is asserted during a system bus cycle. The clock prescalar 208, using a clock generated by the system clock generate 202, increments an internal counter. When the internal counter of clock prescalar 208 reaches a count equal to the content of the total count latch register 210, the internal counter is reset to zero and the time base enable signal is deasserted during the next system bus cycle.

The operation of the clock prescalar 208 is further described. Clock prescalar 208 is a 15-bit programmable clock prescalar circuit that deletes one clock pulse enable each time a threshold count is achieved. The threshold count is determined and limited by the precision of the clock prescalar. Specifically, 15-bit programmable circuit provides a base count of 32,768, of which 95% is used to determine the base total count or 31,129. This allows a maximum range adjustment of plus or minus 5%. The adjustment granularity of one count out of the total base total count is 116 milliseconds per hour. The maximum skew rate, or time adjustment rate, is plus or minus 190 seconds per hour. The system writes zero to the total count latch register 210 to exhibit the generation of the time base enable signal, keeping it deasserted. When the time base enable signal is deasserted, the time clocks on all processors do not change or do not increment. This system would be used in a multi-processor system to synchronize all processor time clocks when the system is initialized. The prescalar can be made longer to increase precision or shorter to reduce costs.

An optional divider, which may be programmable, provides a time base that is in the range of 3–12% of the system clock frequency. Processors in the system count system clocks upon the assertion of the time base enable, thereby allowing the time base to be independent of the system clock frequency. The time base generation apparatus allows the Time Clock in the processor to be adjusted without directly altering its content. This avoids the problem of multiple updates to adjust for a large error. Clock prescalar 208 is adjusted to compensate for the error over some period of time such as until the next clock synchronization computation is performed over the network. If the clock is running fast, the system reduces the time base enable rate rather than attempt to set the time back in a series of small changes normally required to avoid the appearance of time running backwards.

In a multi-processor system, one processor performs the clock synchronization chores with the network and then makes a single adjustment to adjust the clocks of all the processors. The only time a complete processor synchronization is performed is at power on reset. At power on reset, the time base enable signal is inhibited by writing zeros into the total count register, and all processors initialize their Time Clocks. Next, the lead processor sets the prescalar to a default or calibrated value, thereby starting all the clocks.

Figure 3:
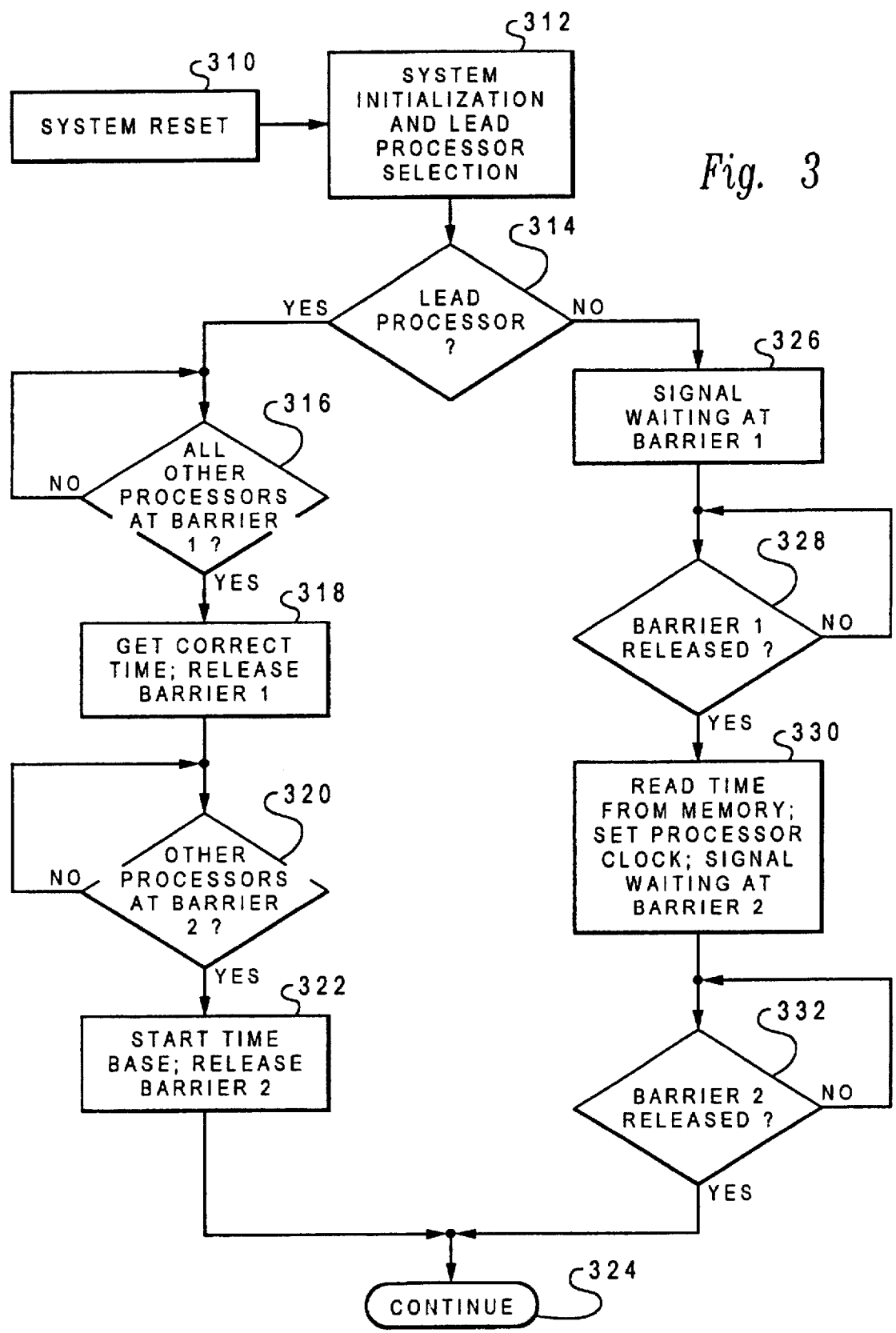
FIG. 3 depicts the process flow diagram that describes initialization sequence used in a multiprocessor system to initialize the Time Clocks of all processors in the system.

FIG. 3 depicts a flow diagram of one processor performing clock synchronization in a multiprocessor system according to the present invention. First, in block 310, a system wide reset is performed. In block 312, after appropriate initialization by each processor, a lead processor is chosen using whatever means (software protocol or hardware selection) the system chooses to use. In step 314, each processor determines whether it is the lead processor or one of the other processors. The lead processor performs blocks 316–322 and the other processor perform blocks 326–332. All processors join in step 324 to continue other system initialization tasks. The barriers and singles described below are normally implemented using semaphors (a software protocol for sharing information and synchronizing processors) which are well understood by those skilled in the art.

In block 316, the lead processor waits until all other processors have reached barrier 1 before proceeding to block 318. In block 318, the lead processor gets the correct time that it then stores in memory before releasing barrier 1 and proceeding to block 320. In block 320, the lead processor waits until all other processors have reached barrier 2 before proceeding to block 322. In block 322 the lead processor starts the time base, causing the Time Clocks of all processors to begin counting, and releases barrier 2 before continuing on to block 324.

As noted previously, all processors except the lead processor perform the actions described in blocks 326–332. In block 326, each processor in this group signals the lead processor that it has reached barrier 1. Then, in block 328, all processors in this group wait for the lead processor to release barrier 1. When the lead processor releases barrier 1, the processors in this group proceed to block 330. In block 330, each processor in this group reads the time stored in memory by the lead processor, and then sets its Time Clock before signaling the lead processor that it is waiting at barrier 2. In 332, all processors in this group wait for the lead processor to release barrier 2, indicating that the clock initialization process is complete and all processors can continue with other system initialization process is complete and all processors can continue with other system initialization as needed (block 324).

This system allows for clock drift to be reduced, thereby providing the user with a more precise time standard using standard precision crystals. The accuracy of the clock is then dependent on the stability of the crystal and the precision of the synchronization granularity of the time base generation apparatus, which is independent of the precision of the crystal. Further, because the time base enable pin of the processor is treated as a normal data input, meeting the normal setup and hold requirements of the processor interface, there is no need for additional complex synchronization in the processor interface.

While the invention has been particularly shown and described with reference to a preferred embodiment, it will be understood by those skilled in the art that various changes in form and detail may be made therein without departing from the spirit and scope of the invention.

I claim:

1. A method for providing system time based generation in a data processing system having at least one microprocessor and a processor clock, comprising:

selecting a lead processor;

waiting until other timing dependent devices within said data processing system reach a first barrier;

selecting a correct time within said data processing system;

storing said correct time in a memory within said data processing system;

releasing said first barrier;

determining whether all other time dependent devices have reached a second barrier;

starting a time base;

reading said correct time from memory; and setting a processor clock using said correct time.

2. The method according to claim 1 further comprising: providing a clock pulse adjustment based upon a threshold count level to said level processor.

3. The method according to claim 2 further comprising: performing a time based count for determining said threshold count based on information from said lead processor.

4. The method according to claim 3 wherein said information is a value computed by said data processing system further comprising:

storing said value in a threshold count latch within said data processing system.

5. The method according to claim 1 further comprising:

synchronously coupling a system clock generation signal to said lead processor.

6. A computer program product for use with a graphics display device, said computer program product comprising:

a computer usable medium having computer readable program code means for providing system time based generation in a data processing system having at least one microprocessor and a processor clock further comprising:

computer readable program code means for selecting a lead processor;

computer readable program code means for causing a computer to wait until other timing dependent devices within said data processing system reach a first barrier;

computer readable program code means for causing a computer to select a correct time within said data processing system;

computer readable program code means for causing a computer to store said correct time in a memory within said data processing system;

computer readable program code means for causing a computer to release said first barrier;

computer readable program code means for causing a computer to determine whether all other time dependent devices have reached a second barrier;

computer readable program code means for causing a computer to start a time base;

computer readable program code means for causing a computer to read said correct time from memory; and computer readable program code means for causing a computer to set a processor clock using said correct time.

7. The computer program product according to claim 6 further comprising:

computer readable program code means for causing a computer to provide a clock pulse adjustment based upon a threshold count level to said lead processor.

8. The computer program product of claim 7 further comprising:

computer readable program code means for causing a computer to perform a time based count for determining said threshold count based on information from said lead processor.

9. The computer program product of claim 8 wherein said information is a value computed by said data processing system and wherein said computer readable program code means causes a computer to store said value in a threshold count latch within said data processing system.

10. The computer program product according to claim 6 further comprising:

computer readable program code means for causing a computer to synchronously couple a system clock generation signal to said lead processor.

11. A system for providing system time based generation in a data processing system having at least one microprocessor and a processor comprising:

means for selecting a lead processor;

means for waiting until other timing dependent devices within said data processing system reach a first barrier;

means for selecting a correct time within said data processing system;

means for storing said correct time in a memory within said data processing system;

means for releasing said first barrier;

means for determining whether all other time dependent devices have reached a second barrier;

means for starting a time base;

means for reading said correct time from memory; and means for setting a processor clock using said correct time.

12. The system according to claim 11 further comprising:

means for providing a clock pulse adjustment based upon a threshold count level to said level processor.

13. The system according to claim 12 further comprising:

means for performing a time based count for determining said threshold count based on information from said lead processor.

14. The system according to claim 13 wherein said information is a value computed by said data processing system further comprising:

means for storing said value in a threshold count latch within said data processing system.

15. The system according to claim 11 further comprising:

means for synchronously coupling a system clock generation signal to said lead processor.

* * * * *